United States Patent [19]

Alpkvist

[11] 4,389,185
[45] Jun. 21, 1983

[54] COMBUSTOR FOR BURNING A VOLATILE FUEL WITH AIR

[76] Inventor: Jan A. Alpkvist, Spindelgatan 2, SE-582 58 Linköping, Sweden

[21] Appl. No.: 202,473

[22] Filed: Oct. 31, 1980

[51] Int. Cl.³ ............................................ F23D 11/44
[52] U.S. Cl. .................................. 431/164; 431/166; 431/211; 431/242; 431/243; 431/351; 60/738; 60/760
[58] Field of Search ................ 60/39.23, 39.27, 39.29, 60/39.6, 39.63, 738, 760; 431/164, 210, 211, 242, 243, 351, 161

[56] References Cited

U.S. PATENT DOCUMENTS

| | | | |
|---|---|---|---|
| 3,007,310 | 11/1961 | Eisele | 60/738 |
| 3,430,443 | 3/1969 | Richardson et al. | 60/738 |
| 3,564,847 | 2/1971 | Wagner | 60/39.71 |
| 3,633,361 | 1/1972 | Bauger | 60/738 |
| 3,913,318 | 10/1975 | Fox et al. | 60/738 |
| 3,961,475 | 6/1976 | Wood | 60/738 |
| 3,982,392 | 9/1976 | Crow | 60/39.23 |
| 4,050,238 | 9/1977 | Holzapfel | 60/39.23 |
| 4,067,191 | 1/1978 | Gronvall et al. | 60/39.27 |
| 4,088,437 | 5/1978 | Holzapfel | 60/738 X |
| 4,255,122 | 3/1981 | Alpkvist et al. | 431/215 |
| 4,262,482 | 4/1981 | Roffe et al. | 60/738 X |
| 4,288,980 | 9/1981 | Ernst | 60/39.23 |

FOREIGN PATENT DOCUMENTS

| | | | |
|---|---|---|---|
| 1282355 | 11/1968 | Fed. Rep. of Germany | 60/760 |
| 359323 | 2/1962 | Switzerland | 60/760 |

Primary Examiner—James C. Yeung
Assistant Examiner—Margaret A. Focarino
Attorney, Agent, or Firm—Finnegan, Henderson, Farabow, Garrett & Dunner

[57] ABSTRACT

A combustor in which fuel is premixed with rather large amounts of primary air in order to obtain a high temperature, rich mixture of volatized fuel and air prior to ignition is designed as a tubular vaporizer provided with a swirl inlet opening in a preheat air chamber and a substantially rotation symmetrical outlet in a combustion chamber the outlet being directed towards inlets for secondary air to the combustion chamber.

3 Claims, 3 Drawing Figures

COMBUSTOR FOR BURNING A VOLATILE FUEL WITH AIR

This invention relates to a combustor for burning a volatile fuel with air.

BACKGROUND OF THE INVENTION

Combustors for burning a volatile fuel with air are used e.g. in heat engines in which the exhaust gases should contain very small amounts of unburnt hydrocarbons of CO and $NO_x$. Simultaneously it is desired to obtain a high degree of efficiency i.e. the heat losses to the stack should be small.

Hitherto the air for the combustion of the fuel has been supplied as a rather cool, non-preheated flow of primary air and a flow of preheated secondary air, the preheating being obtained by exchanging heat with the exhaust gases prior to their passing to the stack.

The use of non-preheated primary air involves a heat loss and the amount of primary air should therefore be kept low relative to the amount of secondary air used. However, such proportion between the primary and secondary air will cause a longer flame and a longer time for the combustion to be completed. In order to obtain low emissions of $NO_x$ the combustion should be cooled down as soon as possible by exchanging heat with the medium to be heated, which in case of a heat engine is the working medium of said engine.

OBJECT AND SUMMARY OF THE INVENTION

It is an object of the present invention to provide a combustor for burning a volatile fuel with preheated air which is able to use preheated air only for the combustion, i.e. preheated air should be used as primary air.

Another object is to provide a combustor allowing a wide load range without risk of "back-fire".

Still another object is to provide a combustor which is cheap to manufacture and has a long life of reliable operation.

In summary a combustor for burning a volatile fuel with preheated air and of the type comprising a generally cylindrical vaporizor extending into a combustion chamber, a fuel supply tube extending coaxially into said vaporizor and terminating therein through radially directed fuel exit openings, said vaporizor having a part extending outside said combustion chamber being provided with primary air inlet openings rendering the air supply a rotary movement coaxially with said vaporizor, the vaporizor terminating into said combustion chamber through an outlet directed towards inlet openings for secondary air supplied to said combustion chamber is according to the present invention characterized in, that said vaporizor is shaped as a substantially rotation symmetrical unit including means for supplying primary and secondary air, the means for supplying secondary air forming parts of walls separating said combustion chamber from a duct delivering preheated primary and secondary air for the combustor.

DETAILED DESCRIPTION

Figure 1:
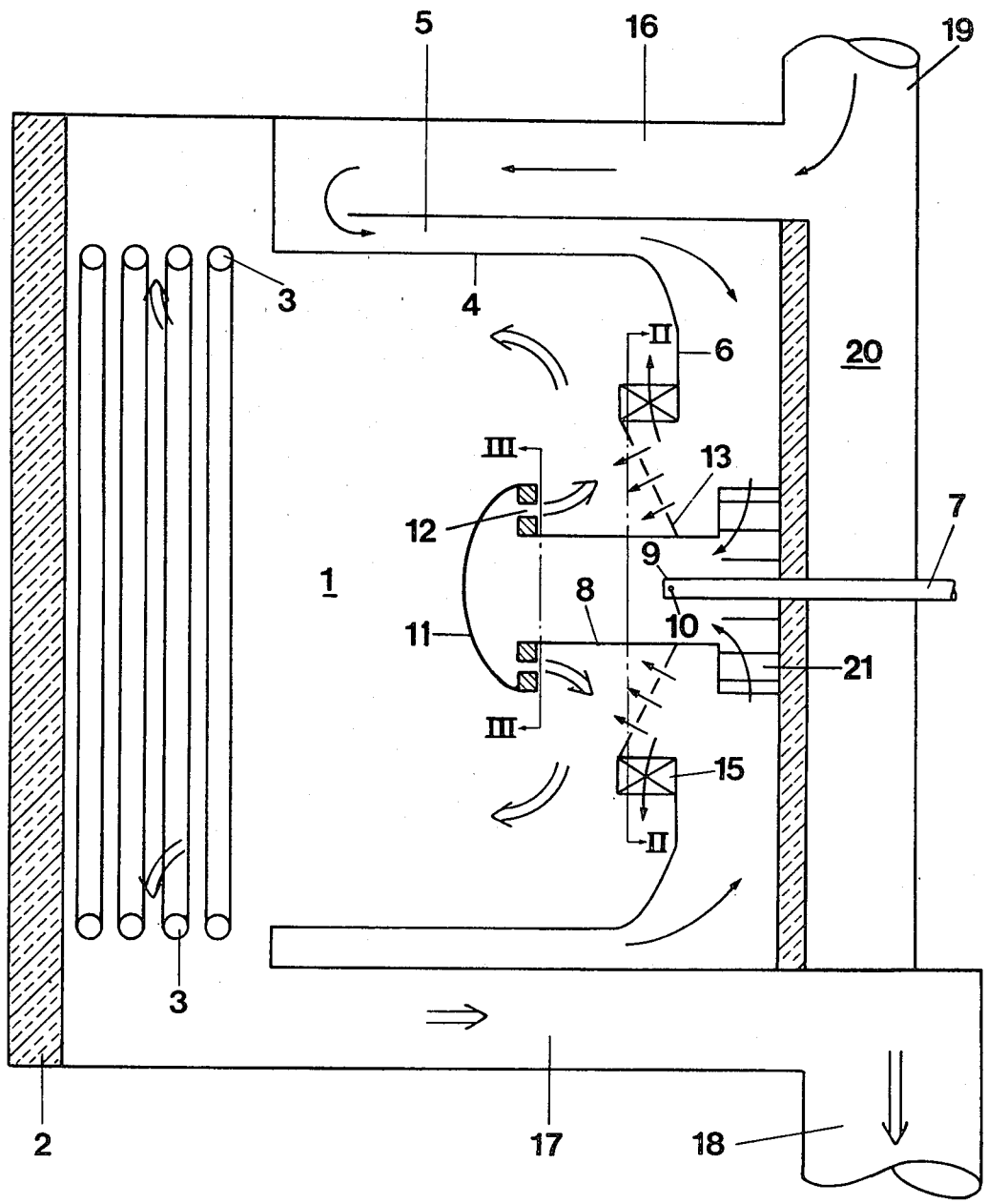
FIG. 1 is a vertical section through a combustion chamber and combustor according to the invention applied to a heat engine.
Figure 3:
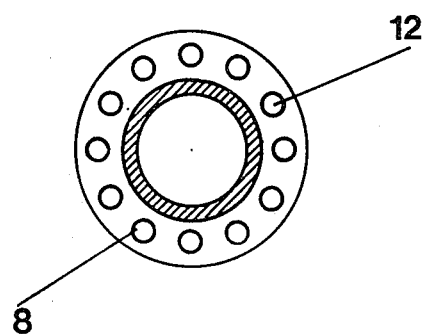
FIG. 3 is a view in section along the line III—III of FIG. 1.

Referring to FIG. 1 a combustion chamber 1 is generally limited by an end wall 2 of insulating material, a number of arcuately shaped tubes 3 containing a working medium of a heat engine, a generally cylindrical wall 4, separating the combustion chamber 1 from a duct 5 containing preheated air and an end wall 6. A fuel supply tube 7 is coaxially mounted relative the combustion chamber 1 and extends into a tubular vaporizer 8. The tube 7 is closed by an end wall 9 but is provided with a number of side openings 10 so that fuel leaving the tube 7 is sprayed on the inner walls of the vaporizer 8. The end of the vaporizer 8 protruding into the combustion chamber 1 is closed by an end wall 11 having a half elliptic shape in axial section as shown in FIG. 1. As will be evident also from FIG. 3 the vaporizer 8 is provided with a number of axially directed, planetarily arranged holes 12 forming outlets directed axially against the end wall 6.

Figure 2:
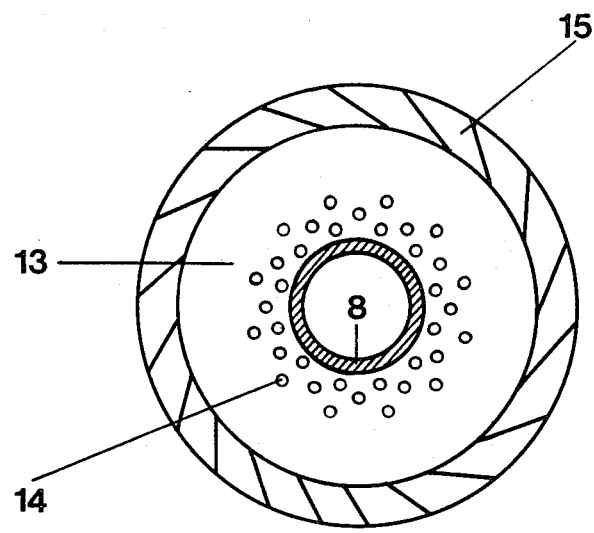
FIG. 2 is a view along the line II—II of FIG. 1.

Said end wall 6 is provided with a conical wall part 13 having a number of holes 14 disposed as shown in FIG. 2 i.e. angularly distributed on three different diameters.

The conical wall part 13 is rigidly connected to the vaporizer 8 and supports a swirler 15 guiding a flow of rotating preheated air into the combustion chamber 1. The preheated air is obtained from a preheater 16, 17 comprising a number of adjacent channels 16, 17 for air and exhaust gas respectively. Only two channels 16, 17 are shown but more than hundred may be provided and arranged evenly angularly distributed around the combustion chamber wall 4. After having passed the heat exchanger the exhaust gases will leave the device through an exhaust duct 18.

Air for the combustion is blown through a duct 19 and chamber 20 prior to entering the heat exchanger. A swirler 21 imparts a rotary movement to the air entering the vaporizer 8.

The device described and shown in the drawings will operate as follows:

A fuel such as kerosene is supplied via the tube 7 at a maximum rate of e.g. 1.2 g per second. Air is supplied through the duct 19 at a rate equivalent to $\lambda = 1.3$. The air leaves the preheater at a temperature of about 570 centigrades and about 18 percent of the air flow is passed through the swirler 21 and the vaporizer 8. Due to the spraying of fuel through the holes 10 the fuel will form a film on the walls of the vaporizer 8 and said fuel will be completely vaporized and thoroughly mixed with air prior to leaving the vaporizer via the holes 12. Said holes 12 will direct a corresponding number of air-vaporized fuel jets towards a flow of preheated air passing the holes 14 in the conical wall part 13. The air-vaporized fuel mixture will now move radially outwards and meet a main flow of preheated air leaving the swirler 15. The air-fuel mixture will be ignited as soon as the first parts thereof have become sufficiently lean as to allow ignition. Combustion will occur simultaneously within rather large volumetric spaces in the combustion chamber and consequently the combustion will be completed within a short time interval. As a further consequence the distance between the vaporizer 8 and the tubes 3 containing the working medium to be heated may be rather short. The temperature within the combustion chamber 1 will be about 1,840 centigrades and the temperature of the exhaust gases after having passed the tubes 3 will be about 750 centigrades. Thus the rapid cooling of the exhaust gases will cause only slight formation of nitrogen oxides. The temperature of the working gas inside the tubes 3 will be kept at about 620 centrigrades. The exhaust gases leaving the preheater will have a temperature of about 275 centigrades.

When idling the heat engine the fuel flow supplied is reduced to about 0.3 grams of fuel per second. $\lambda$ will be kept around 2. The maximum temperature in the combustion chamber will be about 1,370 centigrades. The exhaust gas temperature will be 730° C. prior to and 210° C. after the preheater. The efficiency of the heater will be 85% at full load and 80% at idling of the engine.

Any liquid or gaseous fuel may be used without modifications of the combustor.

The combustor may be manufactured by casting a single unit comprising the elements 8, 11, 13, 15 and 21.

I claim:

1. An improved combustor for burning a volatile fuel with preheated air and of the type comprising a generally cylindrical vaporizer extending into a combustion chamber, to be directly heated by the combustion gases, a fuel supply tube extending coaxially into said vaporizer and terminating therein through radially directed fuel exit openings, said vaporizer having a part extending outside said combustion chamber being provided with inlet openings for receiving primary combustion air and for rendering to the primary air a rotary movement coaxially with said vaporizer, the vaporizer terminating within said combustion chamber and the vaporized fuel-air flowing through an outlet directed towards inlet openings for secondary combustion air supplied directly to said combustion chamber, said secondary air inlet openings being positioned adjacent the vaporizer, the improvement comprising duct means for preheating both the primary and secondary air supply, and said vaporizer being a substantially rotationally symmetrical unit including means connected to said duct means, for channeling said preheated primary and secondary air.

2. A combustor according to claim 1, wherein the vaporized fuel-air flows from said vaporizer into said combustion chamber through a number of evenly angularly distributed nozzle openings of cylindrical shape directed parallel to the axis of said vaporizer and directed oppositely to the flow in said vaporizer.

3. A combustor according to claim 1 or 2, wherein said channeling means includes a wall having a first set of said inlet openings, said first set for admitting a minor part of said secondary air, said first set being evenly angularly distributed on said wall at a plurality of circles of different diameters relative the vaporizer axis, said vaporizer outlet being direct toward said first set of inlet openings, said wall also separating said combustion chamber from the flow of a substantial part of the secondary air to a swirler connecting said wall to said duct means, said swirler for imparting a rotary movement to said substantial part of the secondary air upon its entrance into the combustion chamber.

* * * * *